United States Patent [19]
Kamper

[11] Patent Number: 5,982,370
[45] Date of Patent: Nov. 9, 1999

[54] HIGHLIGHTING TOOL FOR SEARCH SPECIFICATION IN A USER INTERFACE OF A COMPUTER SYSTEM

[75] Inventor: Robert J. Kamper, Round Rock, Tex.

[73] Assignee: International Business Machines Corporation, Armonk, N.Y.

[21] Appl. No.: 08/896,476

[22] Filed: Jul. 18, 1997

[51] Int. Cl.[6] ....................................... G06F 3/00
[52] U.S. Cl. ............................... 345/356; 707/3
[58] Field of Search ............................ 345/157; 707/1–6

[56] References Cited

U.S. PATENT DOCUMENTS

| | | | |
|---|---|---|---|
| 4,763,356 | 8/1988 | Day, Jr. et al. | 379/368 |
| 5,220,625 | 6/1993 | Hatakeyama et al. | 345/347 |
| 5,241,671 | 8/1993 | Reed et al. | 707/104 |
| 5,303,361 | 4/1994 | Colwell et al. | 707/4 |
| 5,598,557 | 1/1997 | Doner et al. | 707/5 |
| 5,664,210 | 9/1997 | Fleming et al. | 707/531 |
| 5,754,873 | 5/1998 | Nolan | 707/527 |

OTHER PUBLICATIONS

Balter, A., "This file conversion utility does ASCII right," DAta Base Advisor, v13, n1, p26(3), 1995.

Castagna, R., "Interlink RemotePointPlus —. . . ,"Windows Magazine, n 707, p134, 1996.

Pgue D., "TV adapters," Macworld, v13, n1, p69(2), 1996.

O'Brien, B. "TView Converter moves your presentation to the big scree," Computer Shopper, v15, n12, p(208), 1995.

IBM Web page from Verity, pp. 1–10 (Mar. 19, 1997).

IBM Web page, Client–side highlighting; tag proposal, pp. 1–2 (Mar. 19, 1997).

*Primary Examiner*—A. Katbab
*Attorney, Agent, or Firm*—Jeffrey S. LaBaw; David H. Judson

[57] ABSTRACT

A search interface is provided that is easy to use and understand. A unique visual metaphor in the form of a "highlight" tool is used for this purpose. The highlighting tool is used to identify search terms. In one embodiment, a user uses the tool to mark text on a document, such as an HTML document displayed in a Web browser. Upon selection of this text, and preferably following a time delay, a pop-up menu appears that offers the user the option of searching for this text. After searching and receiving the results, the user can again use the highlighting tool to mark one or more words/terms (or other information, such as a URL) within the results listed.

22 Claims, 6 Drawing Sheets

... WEB UI DESIGN GUIDELINES ....

FIG. 5a

... WEB UI DESIGN GUIDELINES

FIG. 5b

... WEB UI DESIGN GUIDELINES ....

SEARCH FOR THE PHRASE
SEARCH FOR ALL WORDS
SEARCH FOR ANY WORD
⋮

HIGHLIGHTING TOOL FOR SEARCH SPECIFICATION IN A USER INTERFACE OF A COMPUTER SYSTEM

BACKGROUND OF THE INVENTION

1. Technical Field

The present invention relates in general to a method and system for data processing and in particular to an improved method and system of user interface to a data processing system. Still more particularly, the present invention relates to an improved method and system for searching on a graphical user interface of a data processing system using a "highlighting" graphic device.

2. Description of the Related Art

Within data processing systems, user interface is accomplished in a variety of ways. An increasingly common type of user interface is a graphical user interface (GUI), which provides a user with a graphical and intuitive display of information. Typically, the user interacts with a GUI display with a graphical pointer, which a user controls utilizing a graphical pointing device, such as a mouse, track ball, or joystick. Depending upon the actions allowed by the application of operating system software, the user can select a widget (i.e. a user-discernible feature of the graphic display) by positioning the graphical pointer over the widget and depressing a button associated with the graphical pointing device. Furthermore, depending upon the type of widget, the user can relocate the widget within the graphical display utilizing the well-known drag-and-drop technique. Conventionally, the motion of the graphical pointer within the GUI display has a fixed relationship to the manipulation of the graphical pointing device over all portions of the graphical display. For example, if the user moves the graphical pointing device two units to the right, the graphical pointer responds by moving two scaled units to the right within the graphical display.

A known GUI interface is an Internet Web browser. In the Web environment, client machines effect transactions to Web servers use the Hypertext Transfer Protocol (HTTP), which is a known application protocol providing users access to files (e.g., text, graphics, images, sound, video, etc.) using a standard page description language known as Hypertext Markup Language (HTML). HTML provides basic document formatting and allows the developer to specify "links" to other servers and files. In the Internet paradigm, a network path to a server is identified by a so-called Uniform Resource Locator (URL) having a special syntax for defining a network connection. Use of an HTML-compatible browser (e.g., Netscape Navigator or Microsoft Internet Explorer) at a client machine involves specification of a link via the URL. In response, the client makes a request to the server identified in the link and receives in return a document or object formatted according to HTML. One of the most common usages of the Web browser is to specify a WWW search. Typically, this is accomplished by the user structuring a "search" (usually a word or words and some associated operator(s)) and then entering the search into a search or other dialog box on the interface. The search is then processed using a search engine, with the results then being returned to the user. Conventional Internet search services include those operated by Infoseek, HotBot, Excite, Lycos and AltaVista, among others.

Known search interfaces such as those described above have several shortcomings. In particular, a search service should be easy to understand, easy to use, and it should provide acceptable and useful results to novice, casual and expert users alike. Current GUI search mechanisms attempt to solve this problem by providing one of several options. A first approach, which is implemented in the Web browser, is for the user to simply type in a word or words that are used for the search. Although this interface is simple, it often provides too many results to be of practical use. It is not clear to the novice or casual user how to specify more complex searches. A second approach is to use a guided interface in which the user types in search terms and then has the option of changing certain default parameters, often by selecting a button that identifies the boolean logic used in the search or by describing the effect of the logic on the search results. While more useful than a simple user-controlled text search, this technique increases the complexity of the interface and requires more display screen real estate for implementation. Another approach is a command line style interface in which the user directly enters search terms and logic syntax to define the search parameters. While this approach provides even more flexibility, it often requires detailed knowledge of the specific grammer and syntax used by the specific search engine.

Thus, in the prior art, search engines and their associated interfaces are typically simple, yet inefficient, or they are efficient but complex or arcane. The present invention addresses these and other shortcomings of the prior art by providing a novel interface to an interactive search tool that provides significant advantages over known techniques.

BRIEF SUMMARY OF THE INVENTION

It is a primary object of this invention to specify an interactive search by using a simple graphic device on a computer display screen.

It is another primary object of the present invention to simplify how interactive searches are specified and run using an intuitive visual metaphor of a "highlighting" tool.

It is another important object of this invention to provide a graphic device for use as a visual metaphor as a means within the GUI to identify search terms, to add search terms, and to tag results for saving. The highlighter tool would be the search tool.

It is yet another primary object of this invention to provide a method of searching using a search engine having an "highlight" tool as an input device.

A still further object of this invention is to use a highlight tool to initially specify a search and then use the tool to save selected results returned from that search.

Another more general object of this invention is to provide a highlighting tool for search specification in a graphical user interface of a computer system.

It is still another object of this invention to provide a highlight tool as a "front end" to multiple search engines that have different syntaxes so that the user need not be aware of the specific search query formulation rules for a particular engine in order to obtain results for a given search.

Still another more specific object is to provide a mechanism for use in a Web browser to facilitate searching and "bookmarking" of retrieved information.

Another more specific object of this invention is to provide a method for generating and storing a list of URLS to facilitate a subsequent search without requiring the user to actual do a WWW search to compile the URLS.

Yet another object of this invention is to provide a front end interface to a search engine over conventional Internet Protocol (IP) networks as well as to other GUI or command line interfaces regardless of the underlying operating system or application.

The "highlight" tool metaphor of the inventive search interface is simple and easily understood. The tool enables the user to focus his or her efforts on the task and not the tool or the search strategy itself. The user is not required to learn a new or specialized grammar for each search engine.

According to the invention, a search interface is provided that is easy to use and understand. A unique visual metaphor in the form of a "highlight" tool is used for this purpose. In the preferred embodiment, the standard cursor is converted to the highlight tool upon initiation of the search function. Search terms may be selected; then the search function may be invoked; or, the search function may be initiated with no items selected.

Therefore, in accordance with the invention, a highlighting tool is then used to identify search terms. In one embodiment, a user uses the tool to mark text on a document, such as an HTML document displayed in a Web browser. Upon selection of this text, and preferably following a time delay, a pop-up menu appears that offers the user the option of searching for this text. After searching and receiving the results, the user can again use the highlighting tool to mark one or more words/terms (or other information, such as a URL) within the results listed.

According to one embodiment of the invention, there is described a method for searching the World Wide Web of the Internet using one of a plurality of Internet search engines accessible through a Web browser. The Web browser is supported on a data processing system having a graphical user interface (GUI) and a graphical input device (such as a mouse) that controls a graphical pointer on the interface. The method begins by having the user select one of the plurality of Internet search engines for performing a search. Thereafter, the graphical pointer (or some other display widget) is converted to a predetermined graphic device representing a conventional handheld highlighting tool. In response to a manipulation of the mouse, the highlighting tool is then used to highlight some text portion of a hypertext document being currently displayed by the Web browser. This highlighted portion becomes the "search" entry input to the selected search engine. The Internet (or the World Wide Web, as the case may be) is then searched according to the information input to the selected search engine. After the search is completed, search results are returned to the browser and displayed. If further searching is still required, the highlighting tool is used again to further define the search field, either from the original text or by "marking" up the results.

The above, as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
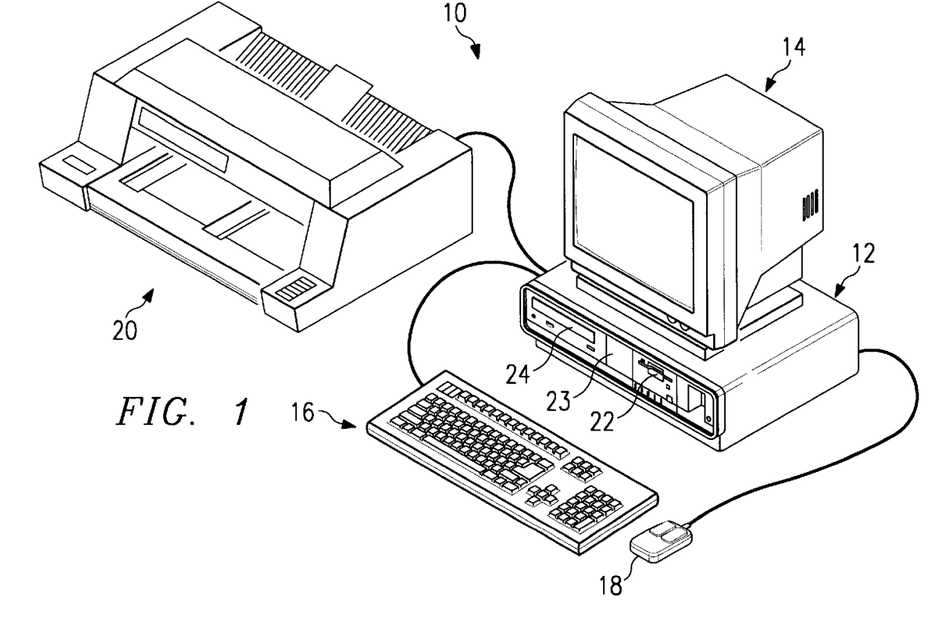
FIG. 1 is a pictorial representation of a data processing system which may be utilized to implement the method and system of the present invention.

With reference now to the figures and in particular with reference to FIG. 1, there is illustrated a preferred embodiment of a data processing system which may be utilized to implement the method of the present invention. As illustrated, data processing system 10 includes system unit 12, display device 14, keyboard 16, mouse 18, and printer 20. As is well-known in the art, system unit 12 receives data for processing from input devices such as keyboard 16, mouse 18, or local area networking interfaces (not illustrated). Mouse 18 is preferably utilized in conjunction with a graphical user interface (GUI) in which hardware and software system objects, including data processing system components and application programs, are controlled through the selection and manipulation of associated graphical objects displayed within display device 14. Although data processing system is illustrated with mouse 18, those skilled in the art will recognize that other graphical pointing devices, including a graphics tablet, stylus, light pen, joystick, puck, trackball, trackpad, and the IBM TrackPoint can also be utilized. Data processing system 10 presents output data to a user via display device 14 and printer 20. To support storage and retrieval of data, system unit 12 further includes diskette drive 22, hard disk drive 23, and CD-ROM drive 24, which are connected to system unit 12 in a well-known manner. Of course, those skilled in the art are aware that other conventional components can also be connected to system unit 12.

Although not meant to be limiting, preferably data processing system is any Intel-based personal computer or workstation running an operating system such as Windows '95, Windows NT, AIX or the like.

Figure 2:
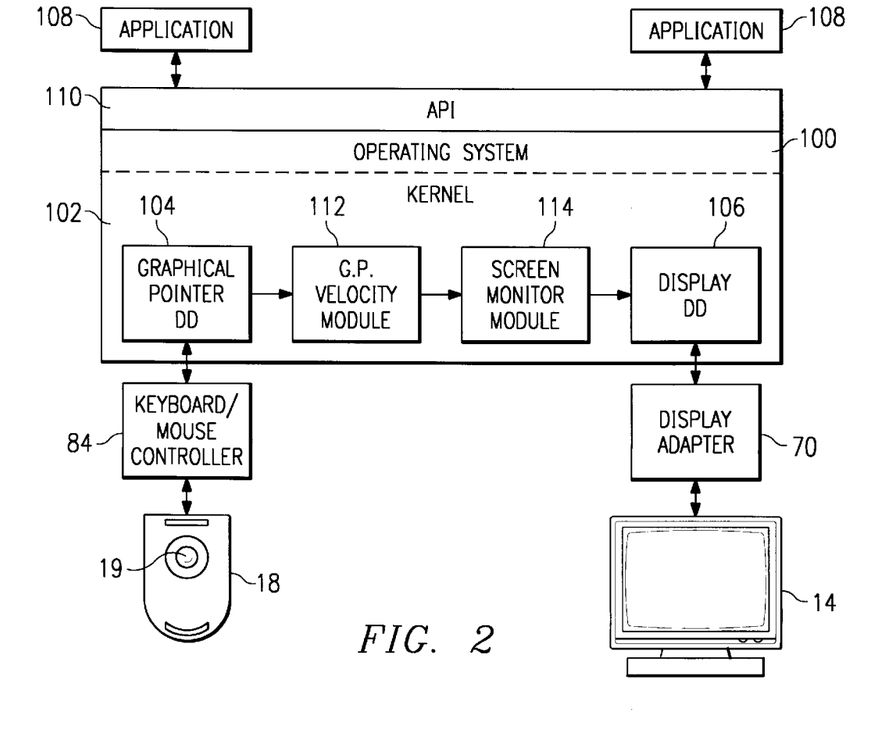
FIG. 2 depicts a block diagram of the interaction between a graphical pointing device, the software configuration utilized by the present invention, and a display device.

With reference now to FIG. 2, there is illustrated a pictorial representation of the software configuration of data processing system 10 following power-on. As depicted, the software configuration of data processing system 10 comprises OS 100, which includes kernel 102, and one or more applications 108, which communicate with OS 100 through Application Programming Interface (API) 110. Kernel 102 comprises the lowest level of OS 100 that controls the operation of the hardware components of data processing system 10 through device drivers, such as graphical pointer device driver 104 and display device driver 106.

As illustrated, graphical pointer device driver 104 and display device driver 106 communicate with keyboard/ mouse controller 84 and display adapter 70, respectively, to support the interconnection of mouse 18 (illustrated in a bottom view) and display device 14 with data processing system 10. In response to movement of trackball 19 of mouse 18, mouse 18 transmits an analog graphical pointer signal to keyboard/mouse controller 84 that describes the direction and rotation of trackball 19. Keyboard/mouse controller 84 digitizes the analog graphical pointer signal and transmits the digitized graphical pointer signal to graphical pointer device 10 driver 104, which thereafter interprets the digitized graphical pointer signal and routes the interpreted graphical pointer signal to graphical pointer velocity module 112 within kernel 102. Graphical pointer velocity module 112 modifies the interpreted graphical pointer signal to retard or accelerate the rate of movement of the graphical pointer manipulated utilizing mouse 18. Graphical pointer velocity module then passes the modified and interpreted graphical pointer signal to screen monitor module 114, which performs GUI actions based on the position of the graphical pointer within display device 14. For example, screen monitor module 114 causes a window to surface within a GUI in response to a user selection of a location within the window. In addition, screen monitor module 114 selectively controls the traversal rate of the graphical pointer when the graphical pointer is positioned within a widget displayed within display device 14. Finally, the graphical pointer signal is passed to display device driver 106, which routes the data within the graphical pointer signal and other display data to display adapter 70, which translates the display data into the R, G, and B signals utilized to drive display device 14. Thus, the movement of trackball 19 of mouse 18 results in a corresponding movement of the graphical pointer displayed within display device 14.

Figure 3:
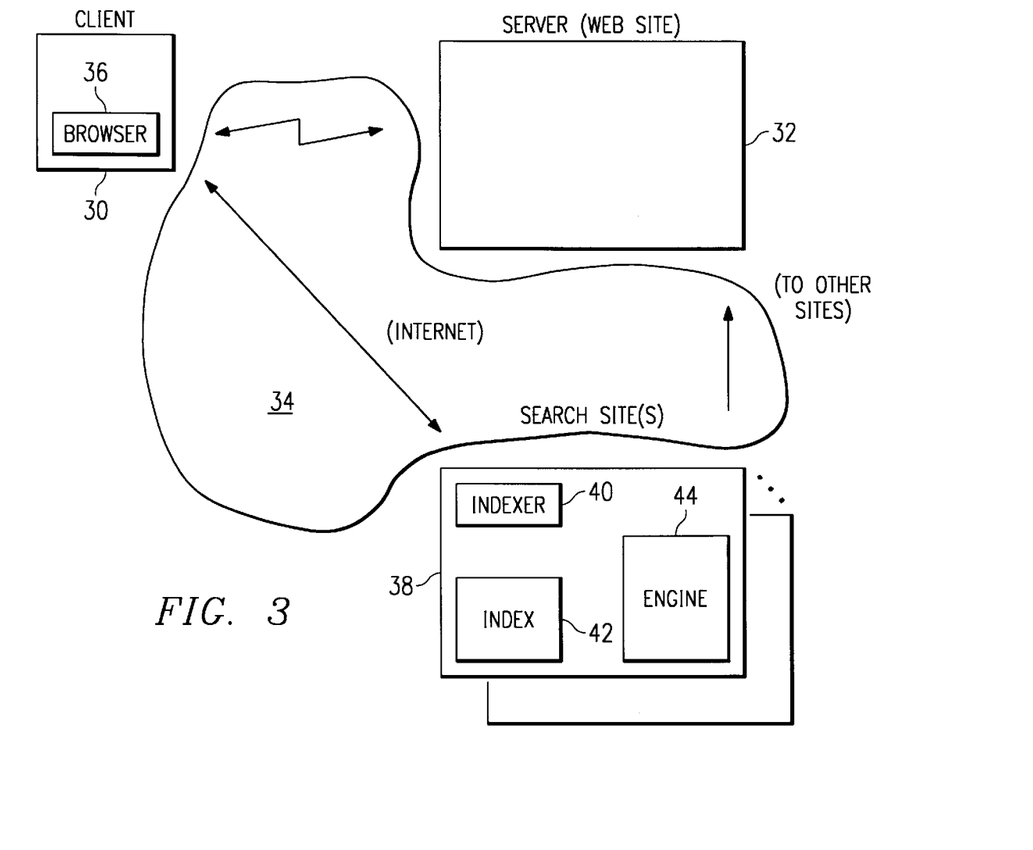
FIG. 3 is a block diagram of a computer network showing a Web client connected to Web server to facilitate an Internet search and retrieval system.

FIG. 3 is a representative computer network in which the data processing system of FIG. 1 is used. In this representative implementation, the data processing system is a "client" machine 30 connected to a Web "server" platform 32 via a communication channel 34 such as the Internet, an Intranet or other known network connection. The data processing system thus includes a browser 36, which is a known software tool used to access the servers of the network. Representative browsers include, among others, Netscape Navigator (all versions), Microsoft Internet Explorer (all versions) or the like, each of which are "off-the-shelf" or downloadable software programs. As is well known in the art, the Web server platform (sometimes referred to as a "Web" site) supports files in the form of hypertext documents and objects. In the Internet paradigm, a network path to a server is identified by a so-called Uniform Resource Locator (URL). The World Wide Web is the Internet's multimedia information retrieval system. In particular, it is a collection of servers of the Internet that use the Hypertext Transfer Protocol (HTTP), which provides users access to files using Hypertext Markup Language (HTML).

The browser 36 of the data processing system is also useful for carrying out a "search" of the Internet or World Wide Web, all in a known manner. In particular, the browser may be used to make calls to one or more Internet search engines (e.g., known commercially as Lycos, Excite, AltaVista, or the like) 38 each of which are typically on a dedicated Web site. An Internet search engine comprises an indexer 40, an index 42 and the search engine software 44 itself. The indexer visits various web sites to build the index for the search engine. The index, sometimes referred to as a catalog, is where the indexer instances store the information located. The search engine component is the software that searches through the index and locates pages containing the entered search terms. Matches are then displayed according to some ranking.

The present invention provides a unique graphical tool that interfaces to a conventional search engine. For illustrative purposes, the invention is described below in the context of an Internet search engine, and thus the tool is shown as being implemented within an existing Web browser. As such, the application that generates and controls the tool may be a browser standalone code, a browser "plug-in" or a function of the browser itself. While the invention is described in this manner, one of ordinary skill should appreciate that the inventive graphical tool may be used in other GUI and text-based interfaces and for other than Internet-based searching. Thus, for example, the invention may be implemented in any search and retrieval system irrespective of the particular interface and application.

Figure 4A:
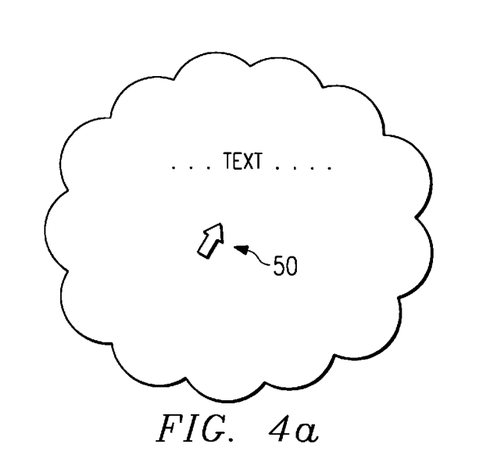
FIG. 4a depicts a pictorial representation of a conventional graphical pointer displayed on a desktop display.
Figure 4B:
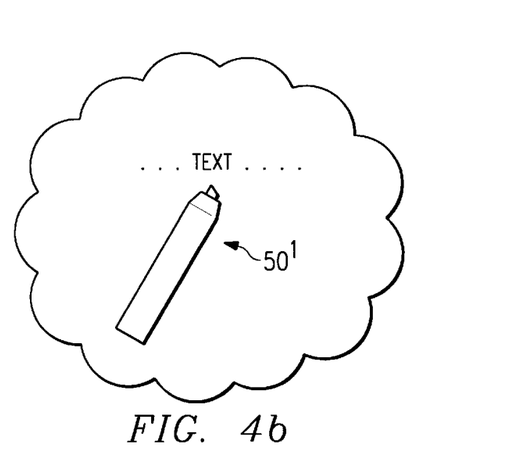
FIG. 4b depicts the inventive highlight marker displayed on the desktop display.

FIGS. 4a–4b illustrates a basic feature of the present invention. FIG. 4a illustrates a conventional display pointer 50, which is normally positioned in the manner described in FIG. 2 by a graphical pointing device (e.g., a mouse). When the user enters a given search mode of operation as illustrated in FIG. 4b (in order to input some search information and thus initiate a search), the display pointer is converted to a graphic device 50'. In the preferred embodiment, the graphic device is a "highlighting" marker or the like, analogous to the handheld "yellow" highlight marker used to mark up text. The highlighting marker or "highlighter" is a common and well-known visual metaphor that is easily understood and used. In particular, the "yellow" highlight marker is commonly used to highlight text information on a printed page, and the present invention exploits this metaphor to facilitate the providing of a simple, easy-to-use interface to a search and retrieval system (in this case, the Internet search engine). Although in the present invention the graphic device is a yellow highlight tool, the device may be of any convenient configuration, form, color or size, as may be adjusted by the system designer or user. To this end, one or more bitmap representations are stored in the data processing system and accessible (by the user) to alter the configuration, color or other characteristic of the highlight tool.

Figure 5A:
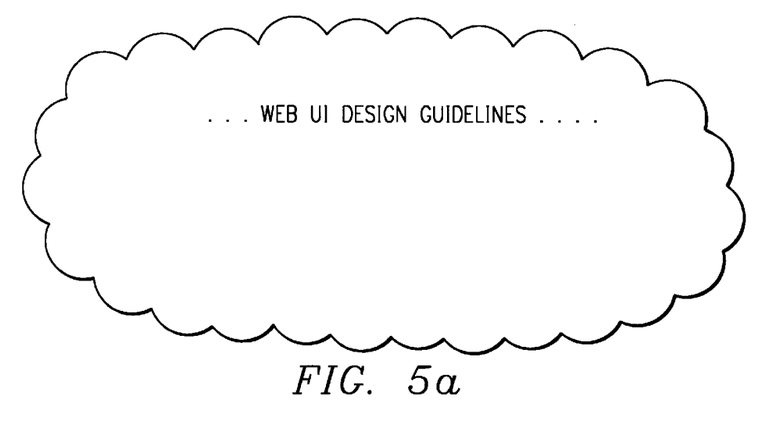
FIGS. 5a–5h illustrate a preferred operation of the present invention in the context of an Internet search.
Figure 5B:
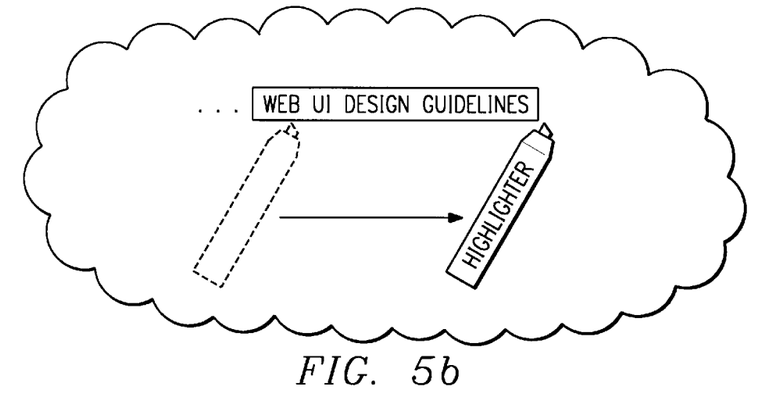

The operation of the highlight tool is shown in FIGS. 5a–5g. FIG. 5a shows a portion of text in an HTML document displayed in a browser window (or frame). It is assumed that the user desires to perform an Internet search for a particular search term that is present in the document being displayed. The highlight tool is then positioned at the first word to be included in the search term and the tool is "dragged" over the word or words that will comprise the search term. In this case, the desired search term is "Web UI Design Guidelines." This selection of the search term through use of the highlighter is illustrated in FIG. 5b. Preferably, the highlight tool is "dragged" across the screen by holding down one of the mouse control buttons and then moving the mouse. Other techniques, such as depressing a key on the keyboard or scrolling a mouse control wheel (e.g., in the case of the Microsoft Intellimouse() may be used as well.

Figure 5C:
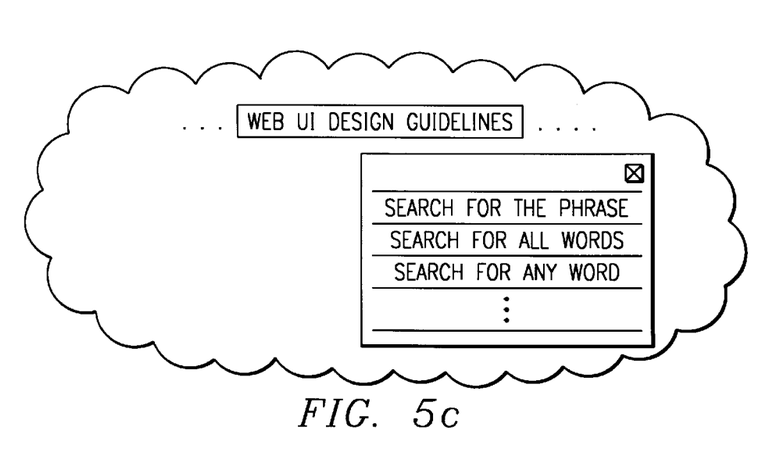

Once the search term is marked by the highlighting tool and the user releases the mouse button, a pop-up menu is optionally displayed to guide the user through subsequent navigation steps. FIG. 5c illustrates one possible form of this pop-up menu. Alternatively, a toolbar may be used in place of the pop-up menu. As can be seen, the menu includes a number of options including: "search for the phrase," "search for all words," and search for "any of the selected terms." Preferably, one of the options is a "default." In the preferred embodiment, the pop-up menu is not displayed automatically, but rather is displayed after a predetermined time delay (e.g., 1–3 seconds). In this way, an experienced user may simply proceed with the default option without having to navigate through the pop-up menu. On the other hand, the pop-up menu provides significant navigational assistance to inexperienced users.

Therefore, according to the present invention, a unique graphic device is used as a highlighting tool to identify search terms. In one embodiment, the user uses the tool to mark text on a document, such as an HTML document displayed in a Web browser. Upon selection of the text, a pop-up menu optionally appears that offers the user the option of searching for this text. After searching and receiving the results, the user can again use the highlighting tool to mark one or more word/terms (or other information) within the results listed.

Figure 5D:
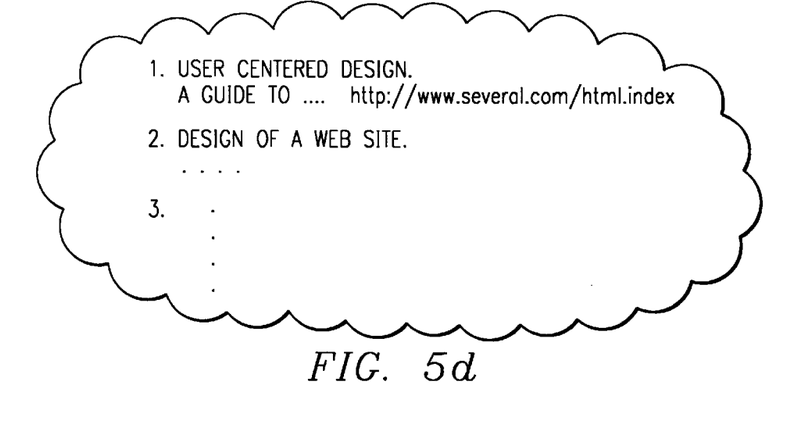
Figure 5E:
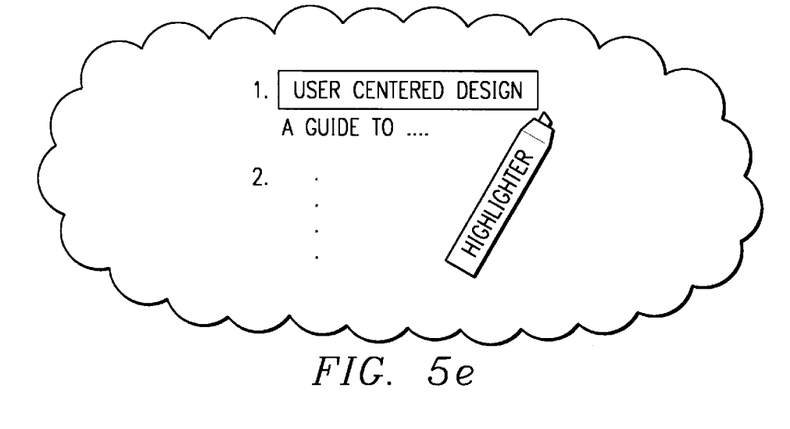
Figure 5F:
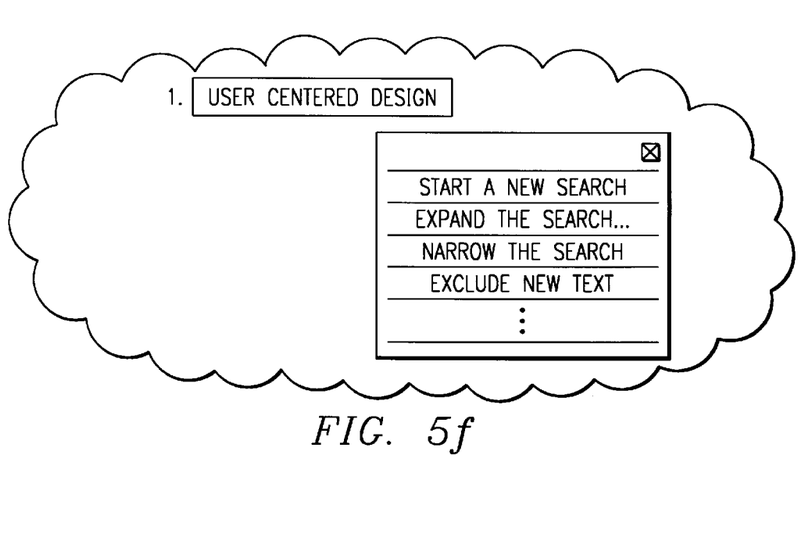

FIG. 5d illustrates a list of results obtained from performing the search at the first level. Assume now that the user desires to do further searching or, alternatively, to save some of the results for a subsequent search session (either by the user or some other users). This operation is illustrated in FIG. 5e. In particular, after receiving the results, the user again uses the highlighter tool to mark one or more words/terms within the results listed. For example, the term "User Centered Design" is highlighted on the abstract for one of the URLS returned by the first search. Upon selection, the popup menu again optionally appears, as shown in FIG. 5f, to provide several appropriate options: start a new search, expand the search to also include the highlighted text, narrow the search to include only those items that include the highlighted text, or exclude all items that include the highlighted text from the current set of results.

Figure 5G:
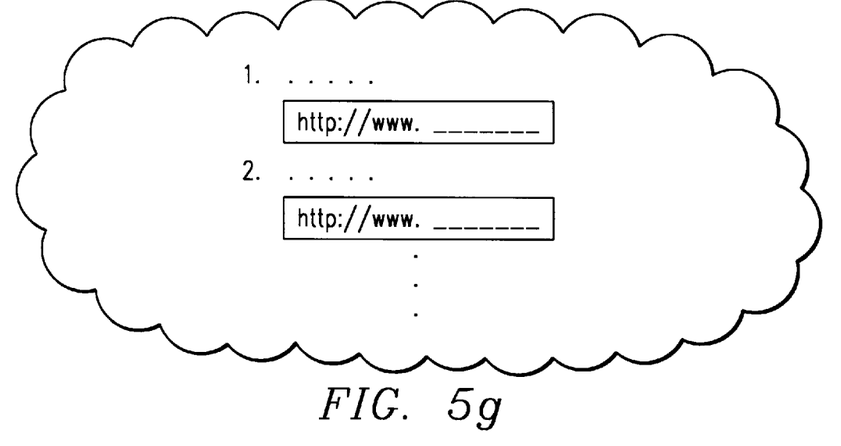
Figure 5H:
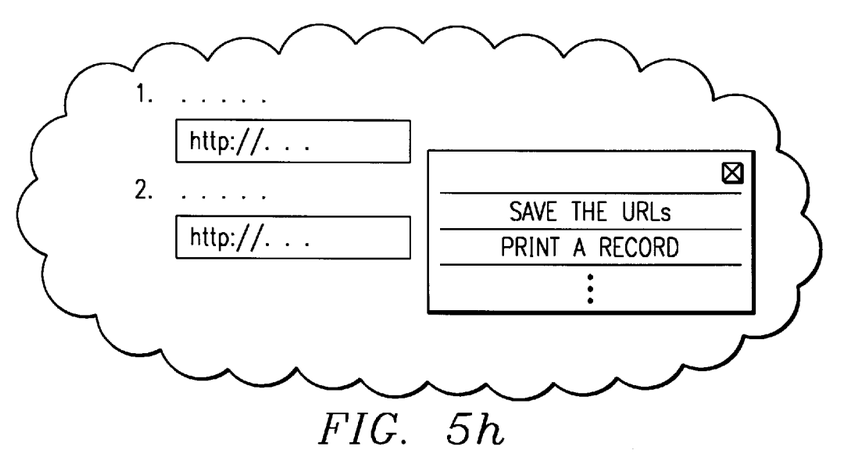

It is now assumed that a second search or a second iteration of the first search has been run. Upon receiving and reviewing the results of this search, as illustrated in FIG. 5g, the user marks the URLS of several of the sites with the highlight marker. FIG. 5h illustrates the pop-up menu that may then be displayed at this time. In particular, this time the pop-up menu provides the option of: "saving the URLs as a bookmark group" (basically a bookmark.html file) with the name of the search as the name of the bookmark group. For example, WWW UI Design Guidelines & User Centered Design would be the default title for the group listed above. The user would then have the option of editing the name of the group. In this manner, the user may bookmark URLs without actually visiting the Web sites identified by those URLS.

Figure 6:
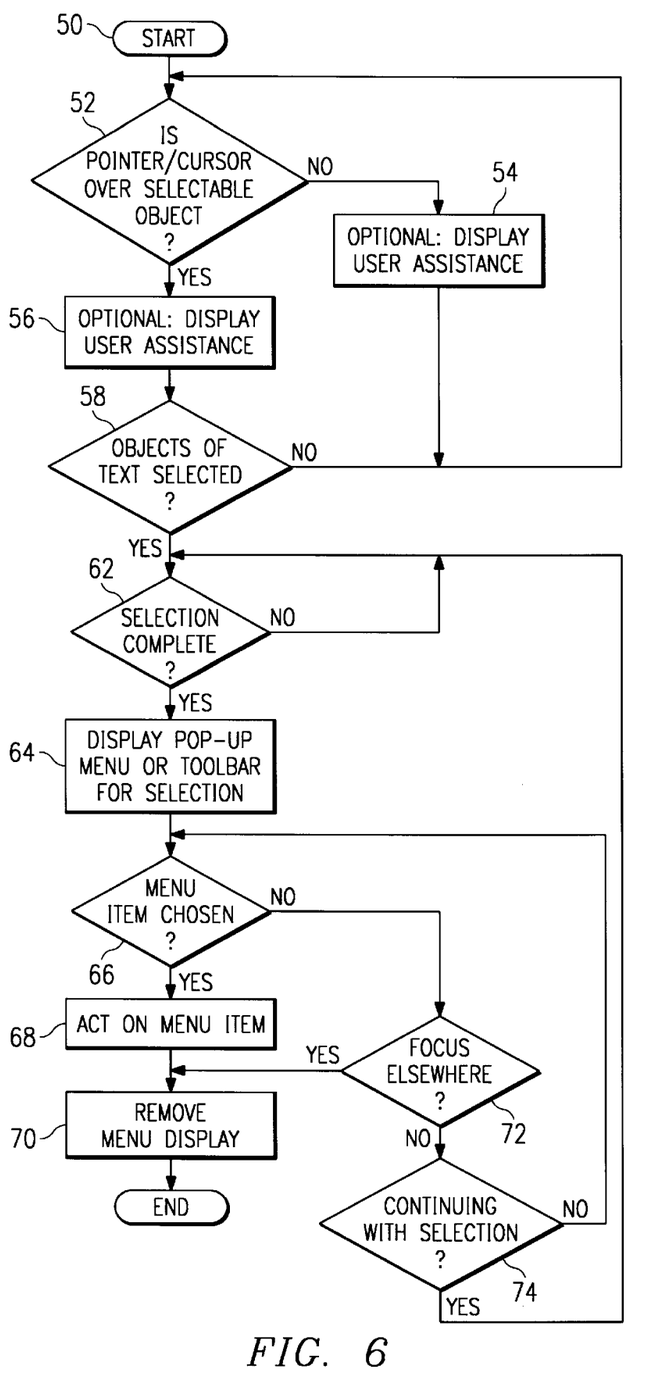
FIG. 6 is a flowchart showing a preferred method to provide pro-active assistance to the user through use of the selection-triggered pop-up menus during a search.

As noted above, the various pop-up menus are optionally displayed to the user during the search formulation and/or re-formulation to provide proactive assistance to the user. A method to provide proactive user assistance is shown in the flowchart of FIG. 6. It begins at step 50 after the highlight tool has been activated. At decision block 52, a test is made to determine whether the highlight tool has been placed over a selectable object (e.g., some text in the document being displayed). If the outcome of the test at step 52 is negative, the routine branches to step 54 to optionally cause a pop-up "help" menu or screen to be displayed to guide the user to take some action. Thus, for example, the menu may include such text as "please highlight text that you would like to search" or the like. If the outcome of the test at step 52 is positive, then the routine continues. The method may then optionally display an additional "help" screen at step 56 if needed (e.g., after a predetermined time delay). Thus, for example, this screen may say "you have placed the highlight tool; do you want to initiate a search" or the like. At step 58, a test is made to determine whether an object (e.g., a search comprising a word or words) has been selected. If the outcome of the test at step 58 is negative, the routine cycles back as indicated. If, however, the outcome of the test at step 58 is positive, the routine continues at step 62 to test whether the selection is complete. If not, the routine cycles back as indicated. If, however, the outcome of the test at step 62 is positive, the routine continues.

In particular, at step 64, a pop-up menu or other toolbar is then displayed to facilitate a selection. This step corresponds to FIG. 5c above. A test is then made at step 66 to determine whether a menu item has been chosen by the user. If the menu item has been selected, the routine initiates the requested action at step 68, removes the menu display from the screen at step 70 and then ends. If, however, the output of the test at step 66 indicates that the menu item has not been selected (which may occur after a timeout), a test is made at step 72 to determine whether the user is focused elsewhere on the display. If the outcome of the test at step 72 is positive, the routine continues with step 70 to remove the menu display. If, however, the outcome of the test at step 72 indicates that the user is still focused on making a selection of text for the search, the routine branches to step 74 to test whether the user is continuing with the text selection process (using the highlighter). If not, the routine branches back to step 66 to determine whether a menu item has been chosen by the user. If, however, the outcome of the test at step 74 indicates that the user is continuing with the highlighting process, the routine branches back to step 62 to determine whether the selection is complete. The operation continues as before until complete.

The flowchart of FIG. 6 is a representation of a desired method to provide proactive user assistance using selection-triggered pop-up menus or toolbars during the use of the highlight tool. The described method may be repeated at various levels of the search as may be desired to facilitate the user's navigational through the search and retrieval methods.

The present invention works in a simple manner that is familiar to those who typically conduct searches, and provides an easy metaphor to grasp. The highlight tool is used as a "front end" to multiple search engines that have differing syntaxes, and the user need not be aware of the specific formulation of the query for the engine in order to get results. As noted above, for HTML, this solution provides a means to create a bookmark list automatically.

The present invention thus provides numerous advantages. In the context of WWW searching, users typically have to visit Web sites in order to add a URL as a bookmark or "favorite" site so that the site can be located easily at some subsequent time. Although there are ways in which one can save the results of a search and later visit those site(s), it is not presently possible to perform an interactive search and then end up with a short list of "hits" that meet one's criteria. Nor it is simple to build a search through exploration. The present invention provides a unique solution to these and other problems of the prior art.

As described above, aspects of the present invention pertain to specific "method steps" implementable on computer systems. In an alternate embodiment, the invention may be implemented as a computer program product for use with a computer system. Those skilled in the art should readily appreciate that programs defining the functions of the present invention can be delivered to a computer in many forms, which include, but are not limited to: (a) information permanently stored on non-writable storage media (e.g., read only memory devices within a computer such as ROM or optical disks readable by CD-ROM drive ); (b) information alterably stored on writable storage media (e.g., floppy disks within diskette drive or hard disk drive ); or (c) information conveyed to a computer through communication media, such as through a computer or telephone network. It should be understood, therefore, that such media, when carrying computer readable instructions that direct the method functions of the present invention, represent alternate embodiments of the present invention.

As used herein, an Internet "client" should be broadly construed to mean any computer or component thereof directly or indirectly connected or connectable in any known or later-developed manner to a computer network, such as the Internet. The term Internet "server" or web site should also be broadly construed to mean a computer, computer platform, an adjunct to a computer or platform, or any component thereof. Of course, a "client" should be broadly construed to mean one who requests or gets the file, and "server" is the entity which downloads the file.

While the invention has been particularly shown and described with reference to a preferred embodiment, it will be understood by those skilled in the art that various changes in form and detail may be made therein without departing from the spirit and scope of the invention.

What is claimed is:

1. A method for identifying information for input to a search engine supported on a data processing system having a graphical user interface and a graphical pointing device that controls a graphical pointer on the graphical user interface, comprising the steps of:

displaying a document on the graphical user interface;

converting the graphical pointer to a predetermined graphic device; and in response to a manipulation of the graphical pointing device and without keystroke entry, associating the graphic device with a text portion in the document to thereby identify information for input to the search engine.

2. The method as described in claim 1 wherein the graphical user interface includes a Web browser.

3. The method as described in claim 2 wherein the document is formatted according to a Hypertext Markup Language (HTML).

4. The method as described in claim 3 wherein the search engine is an Internet search engine having an indexer for retrieving web sites, an index for storing the web sites retrieved, and a search engine for identifying web sites having the information input to the search engine.

5. The method as described in claim 1 further including the step of displaying a menu of search options to the user after the user identifies the information for input to the search engine.

6. The method as described in claim 5 further including the step of delaying the display of the menu for a predetermined time period.

7. The method as described in claim 1 wherein the graphic device represents a highlight marker.

8. The method as described in claim 7 wherein the graphical pointer device is converted to the highlight marker using a bitmap.

9. A method for searching the World Wide Web of the Internet using one of a plurality of Internet search engines accessible through a Web browser, the Web browser supported on a data processing system having a graphical user interface (GUI) and a mouse that controls a cursor, the method comprising the steps of:

selecting one of the plurality of Internet search engines for performing a search;

converting the cursor to a predetermined graphic device representing a highlighting tool; and in response to a manipulation of the mouse, associating the highlighting tool with a text portion in a hypertext document being displayed by the Web browser to thereby identify information for input to the selected search engine.

10. The method as described in claim 9 further including the step of searching the Internet according to the information input to the selected search engine.

11. The method as described in claim 10 further including the step of returning results of the search to the browser and displaying the results in a given format.

12. The method as described in claim 11 further including the step of associating the highlighting tool with a given portion of the results displayed in the given format to identify a new search.

13. The method as described in claim 12 wherein the given portion of the results comprises a set of Uniform Resource Locators (URLS).

14. The method as described in claim 9 further including the step of displaying a menu of search options to the user after the user identifies the information for input to the selected search engine.

15. The method as described in claim 14 further including the step of delaying the display of the menu for a predetermined time period.

16. A method for searching the World Wide Web of the Internet using one of a plurality of Internet search engines accessible through a Web browser, the Web browser supported on a data processing system having a graphical user interface (GUI), the method comprising the steps of:

selecting one of the plurality of Internet search engines for performing a search;

highlighting a text portion in a hypertext document being displayed by the Web browser to identify information for input to the selected search engine; and executing a search of the Internet according to the information input to the selected search engine.

17. The method as described in claim 16 wherein the text portion is highlighted using a graphic device that is manipulated over the text portion.

18. The method as described in claim 16 wherein the graphic device is manipulated over the text portion by activating and moving a graphical pointing device.

19. A method for highlighting given text displayed in a document on a display of a data processing system having a graphical pointing device, comprising the steps of:

outputting a widget on the display, the widget representing a highlighting tool;

correlating manipulation of the graphical pointing device and movement of the widget over the given text;

highlighting the given text as the widget moves over the given text; and providing a user with an option to use the given text, or a portion thereof, to drive a search engine.

20. A computer program product in a computer readable media for identifying information to be input to a search engine supported on a data processing system, the data processing system having a graphical user interface and a graphical pointing device that controls a graphical pointer on the graphical user interface, the computer program product comprising:

means for converting the graphical pointer to a predetermined graphic device representing a highlighting tool; and means responsive to manipulation of the graphical pointing device for associating the graphic device with a text portion in the document to identify information for input to the search engine.

21. The computer program product as described in claim 20 further including means for displaying a menu of search options to the user after the user identifies the information for input to the search engine.

22. A computer connected to the World Wide Web of the Internet, comprising:

a processor;

an operating system;

a graphical user interface (GUI);

a graphical pointing device that controls a graphical pointer on the graphical user interface;

a Web browser;

a search specification tool, comprising:

means for converting the graphical pointer to a predetermined graphic device representing a highlighting tool; and means responsive to manipulation of the graphical pointing device for associating the graphic device with a text portion in the document to identify information for input to the search engine.

* * * * *